(12) United States Patent
Park et al.

(10) Patent No.: US 12,167,343 B2
(45) Date of Patent: Dec. 10, 2024

(54) PANEL SPECIFIC UL POWER CONTROL

(71) Applicant: Nokia Technologies Oy, Espoo (FI)

(72) Inventors: Kyoungmin Park, Suji gu (KR); Juha P. Karjalainen, Oulu (FI); Sami-Jukka Hakola, Kempele (FI); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 315 days.

(21) Appl. No.: 17/634,319

(22) PCT Filed: Jul. 30, 2020

(86) PCT No.: PCT/IB2020/057230
§ 371 (c)(1),
(2) Date: Feb. 10, 2022

(87) PCT Pub. No.: WO2021/028767
PCT Pub. Date: Feb. 18, 2021

(65) Prior Publication Data
US 2022/0295413 A1 Sep. 15, 2022

Related U.S. Application Data

(60) Provisional application No. 62/886,061, filed on Aug. 13, 2019.

(51) Int. Cl.
*H04W 52/14* (2009.01)
*H04W 16/28* (2009.01)
(Continued)

(52) U.S. Cl.
CPC ......... *H04W 52/146* (2013.01); *H04W 16/28* (2013.01); *H04W 52/10* (2013.01); *H04W 52/242* (2013.01)

(58) Field of Classification Search
None
See application file for complete search history.

(56) References Cited

U.S. PATENT DOCUMENTS

| 2018/0262993 A1 | 9/2018 | Akkarakaran et al. |
| 2019/0230599 A1 | 7/2019 | Nam et al. |
| 2020/0305088 A1* | 9/2020 | Nory ............... H04W 56/001 |

FOREIGN PATENT DOCUMENTS

| CN | 108781416 A | 11/2018 |
| CN | 109155659 A | 1/2019 |

(Continued)

OTHER PUBLICATIONS

Office action received for corresponding Chinese Patent Application No. 202080068545, dated Jan. 19, 2024, 8 pages of office action and no pages of office action translation available.

(Continued)

*Primary Examiner* — Suhail Khan
(74) *Attorney, Agent, or Firm* — McCarter & English, LLP

(57) ABSTRACT

Systems, methods, apparatuses, and computer program products for panel specific uplink power control. A method may include receiving, at a user equipment, an uplink grant indicating an uplink candidate beam for uplink transmission; receiving, at the user equipment, a plurality of power control configurations, wherein one of a plurality of sources of spatial relation information is associated with one of the plurality of power control configurations; determining, at the user equipment, a power control configuration of the plurality of power control configurations for the indicated uplink candidate beam based on an association between a source of spatial relation information and the power control configuration; and transmitting, from the user equipment, uplink data using the indicated uplink candidate beam and the determined power control configuration.

20 Claims, 9 Drawing Sheets

(51) Int. Cl.
*H04W 52/10* (2009.01)
*H04W 52/24* (2009.01)

(56) References Cited

FOREIGN PATENT DOCUMENTS

| | | |
|---|---|---|
| WO | 2018128409 A1 | 7/2018 |
| WO | 2018/231141 A1 | 12/2018 |
| WO | 2019/049107 A1 | 3/2019 |

OTHER PUBLICATIONS

"3rd Generation Partnership Project; Technical Specification Group Radio Access Network; NR; Physical layer procedures for control (Release 15)", 3GPP TS 38.213, V15.5.0, Mar. 2019, pp. 1-104.

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.

International Search Report and Written Opinion received for corresponding Patent Cooperation Treaty Application No. PCT/IB2020/057230, dated Oct. 22, 2020, 15 pages.

"Feature lead summary#3 of Enhancements on Multi-beam Operations", 3GPP TSG RAN WG1 Meeting #97, R1-1907860, Agenda: 7.2.8.3, LG Electronics, May 13-17, 2019, 35 pages.

* cited by examiner

| Reference RS for beam | PL-RS | OL settings |
|---|---|---|
| RS ID #0 | RS ID #A | J=1 ($\alpha = a, P_0 = x$) |
| RS ID #1 | RS ID #B | J=2 ($\alpha = b, P_0 = y$) |
| RS ID #2 | RS ID #A | J=3 ($\alpha = c, P_0 = z$) |
| RS ID #3 | RS ID #C | J=4 ($\alpha = d, P_0 = w$) |

| State idx | Reference RS for beam | QCL assumption | PL-RS | OL settings |
|---|---|---|---|---|
| 0 | RS ID #0 | Type D | RS ID #A | $j=1$ ($\alpha=a, P_0=x$) |
| 1 | RS ID #1 | Type D | RS ID #B | $j=2$ ($\alpha=b, P_0=y$) |
| 2 | RS ID #0, #1 | Type D | RS ID #A | $j=3$ ($\alpha=c, P_0=z$) |
| 3 | RS ID #0, #1, #2 | Type D | RS ID #C | $j=4$ ($\alpha=d, P_0=w$) |

612 / 614 / 616 / 624 / 626

630

| State idx | UL beam selection | How to measure pathloss | OL settings |
|---|---|---|---|
| 0 | One beam indicated by RS ID #0 | PL is measure from RS #A | $j=1$ |
| 1 | One beam indicated by RS ID #1 | PL is measure from RS #B | $j=2$ |
| 2 | Two beams indicated by RS ID #0, #1 | For beam #0, PL is measure from RS #A<br>For beam #1, PL is measured from RS #B | For beam #0, $j=1$<br>For beam #1, $j=2$ |
| 3 | Three beams indicated by RS ID #0, #1, #2 | For both beam #0, #2, PL is measure from RS #A<br>For beam #1, PL is measured from RS #B | For beam #0, $j=1$<br>For beam #1, $j=2$<br>For beam #2, $j=3$ |

PANEL SPECIFIC UL POWER CONTROL

RELATED APPLICATION

This application claims priority to PCT Application No. PCT/IB2020/057230, filed on Jul. 30, 2020 which claims priority to U.S. Application No. 62/886,061, filed on Aug. 13, 2019, each of which is incorporated herein by reference in its entirety.

BACKGROUND

Technical Field

The example and non-limiting embodiments relate generally to communications and, more particularly, to uplink transmission power control.
Brief Description of Prior Developments
It is known, for a user equipment in a radio resource control connected state, to implement a scheme for uplink power control for a single user equipment panel.

BRIEF DESCRIPTION OF THE DRAWINGS

The foregoing aspects and other features are explained in the following description, taken in connection with the accompanying drawings, wherein:
FIG. 5 is a chart illustrating features as described herein;
FIG. 6 is a flowchart illustrating steps as described herein.

DETAILED DESCRIPTION OF EMBODIMENTS

Figure 1:
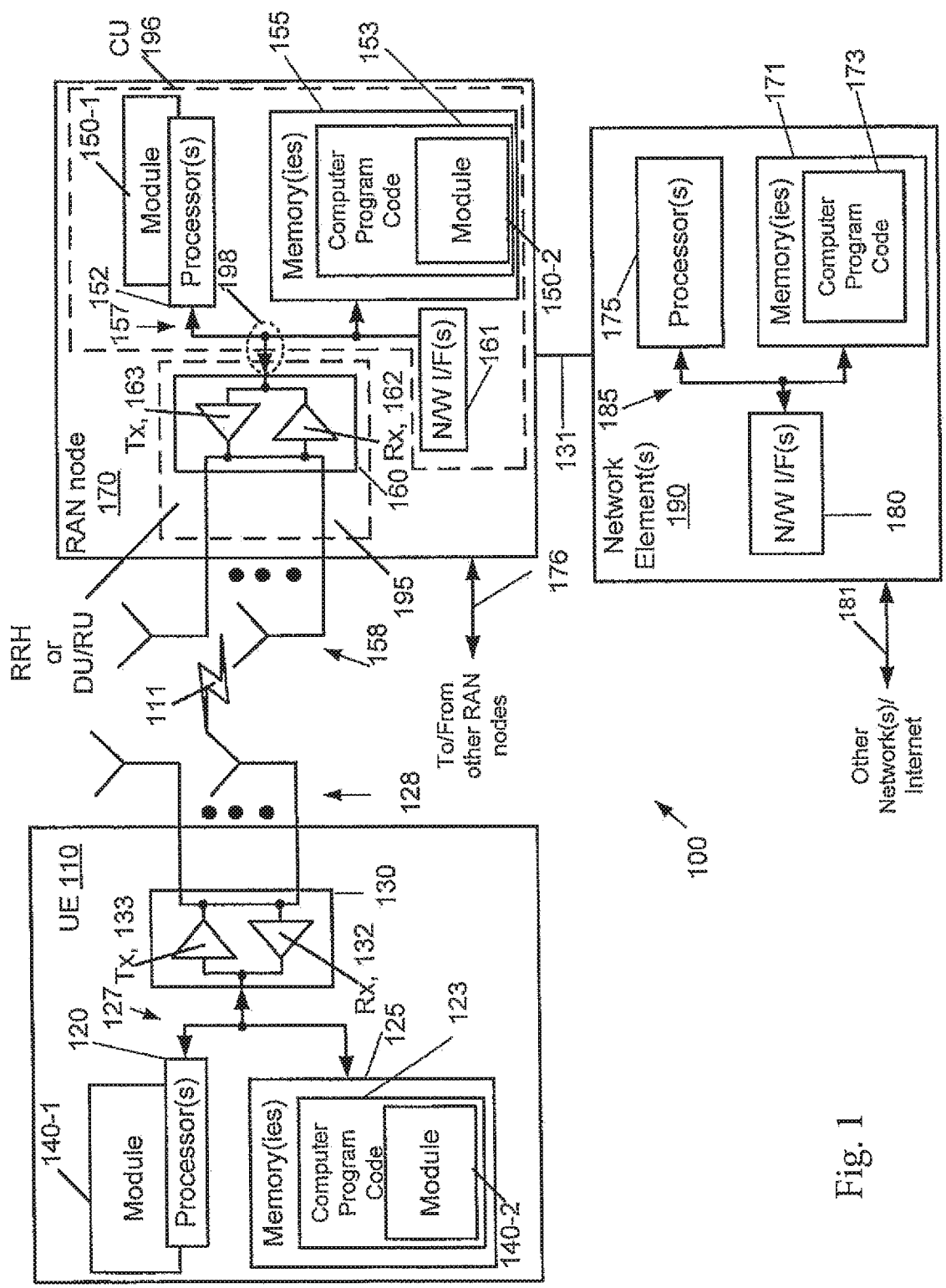
FIG. 1 is a block diagram of one possible and non-limiting exemplary system in which the exemplary embodiments may be practiced.
Figure 2:
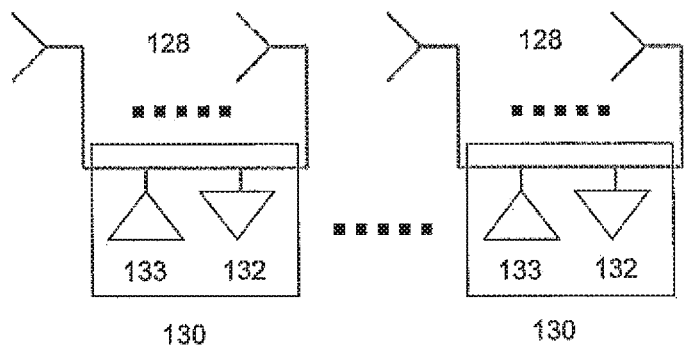
FIG. 2 is a block diagram illustrating a possible and non-limiting feature of an exemplary system in which the exemplary embodiments may be practiced.

The following abbreviations that may be found in the specification and/or the drawing figures are defined as follows:
3GPP third generation partnership project
5G fifth generation
5GC 5G core network
AMF access and mobility management function
CE control element
CU central unit
DCI downlink control information
DL downlink
DSP digital signal processor
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) 5G NodeB; base station for 5G/NR, i.e., a node providing NR user plane and control plane protocol terminations towards the UE, and connected via the NG interface to the 5GC
I/F interface
ID identifier
LTE long term evolution
MAC medium access control
MME mobility management entity
multi-TRP multiple transmission/reception points
ng or NG new generation
ng-eNB or NG-eNB new generation eNB
NR new radio
N/W or NW network
PC power control
PDCP packet data convergence protocol
PL-RS pathloss measurement reference signal
PRACH physical random access channel
PUCCH physical uplink control channel
PUSCH physical uplink shared channel
PHY physical layer
QCL quasi co-location
RAN radio access network
RLC radio link control
RS reference signal
RRH remote radio head
RRC radio resource control
RU radio unit
Rx receiver
SDAP service data adaptation protocol
SGW serving gateway
SMF session management function
SRI SRS resource index
SRS sounding reference signal
TCI transmission configuration index
TS technical specification
Tx transmitter
UE user equipment (e.g., a wireless, typically mobile device)
UL uplink
UPF user plane function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user UE 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. FIG. 2 shows an example of multiple transceivers 130, each of which includes a receiver, Rx, 132 and a transmitter, Tx, 133. A person of ordinary skill in the art would understand how to combine the example of FIG. 2 with the example of FIG. 1. The combination of FIG. 1 and FIG. 2 would result in a UE 110 with multiple panels. The example embodiments may be practiced with such an example UE 110.

Figure 3:
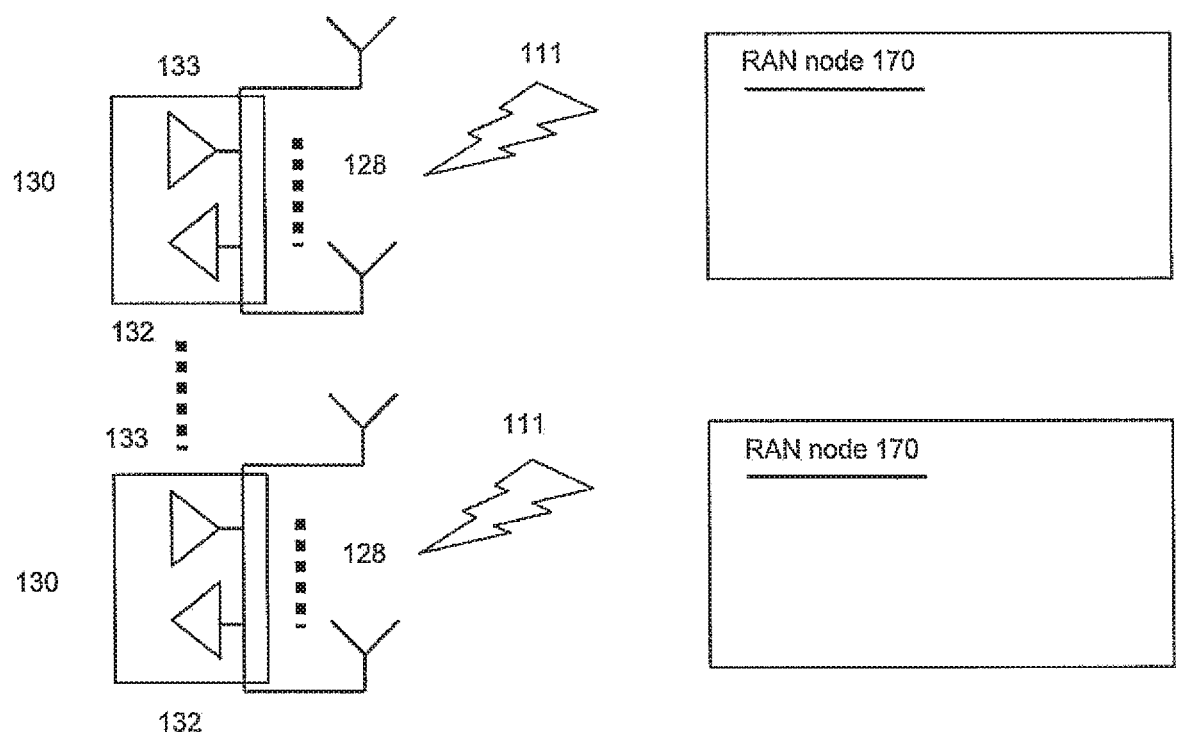
FIG. 3 is a block diagram illustrating a possible and non-limiting feature of an exemplary system in which the exemplary embodiments may be practiced.

The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111. FIG. 3 shows an example of multiple transceivers 130, each of which includes a receiver, Rx, 132 and a transmitter, Tx, 133, where each transceiver 130 is connected to a different RAN node 120 via a wireless link 111. A UE 110 may comprise multiple transceivers 130, and may be connected to multiple RAN nodes 170 via wireless link(s) 111. Each connection between a UE 110 transceiver and a RAN node 170 may make use of a different transceiver 130 panel. A person of ordinary skill in the art would understand how to combine the example of FIG. 3 with the example of FIG. 1. The combination of FIG. 1 and FIG. 3 would result in a UE 110 with multiple panels, where each panel is capable of engaging a different transmission/reception point (TRP). The example embodiments may be practiced with such an example UE 110.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein generally relate to uplink power control where a UE may use multiple panels and/or beams for uplink transmission.

3GPP New Radio (NR) Rel-15, provides support for beam-specific uplink transmission (UL TX) power control (PC) schemes. Beam-specific power control is supported by configuration of an association between an UL beam indicator (for example, a SRS resource index (SRI)), a beam-specific pathloss measurement, and an open-loop parameter setting. Rel-15 physical layer specification 3GPP TS 38.213 defines UE procedures for both open-loop (OL)-based transmission power control and inner-loop-based transmission power control, as well as related pathloss (PL) measurements for each type of power control. 3GPP TS 38.331 defines configurations and higher-layer signaling for UL power control schemes.

Rel-16 provides support for panel-aware uplink beam selection for a single antenna panel UL transmission. However, a unified forward-compatible solution covering both single panel UL UE transmission and simultaneous multi-panel UL UE transmission needs to be specified. Because the pathloss values associated with TX and RX beam pairs change on the basis of each panel, there is a need to enhance Rel-15 beam-specific UL TX power control schemes to also provide support for antenna panel-specific transmission power control.

Support for panel-specific power control as well as beam-specific power control may be achieved by defining an UL beam indicator for each UE panel. However, defining an UL beam indicator for each UE panel would mean including an SRI field in downlink control information (DCI) for each UE panel. Consequently, the size of DCI will vary according to the number of SRI fields, corresponding to the number of UE panels. A feature of an example embodiment of the present invention may comprise not incorporating variable-size DCI.

To avoid the use of DCI of variable size while achieving support for panel-specific power control as well as beam-specific power control, a unified beam indicator may be specified instead of a panel-specific UL beam indicator. This unified beam indicator may be, for example, an uplink transmission configuration index (UL TCI) state. Additionally, an associated uplink power control (UL PC) algorithm/configuration adapted to such a unified beam indicator may be implemented.

Figure 4:
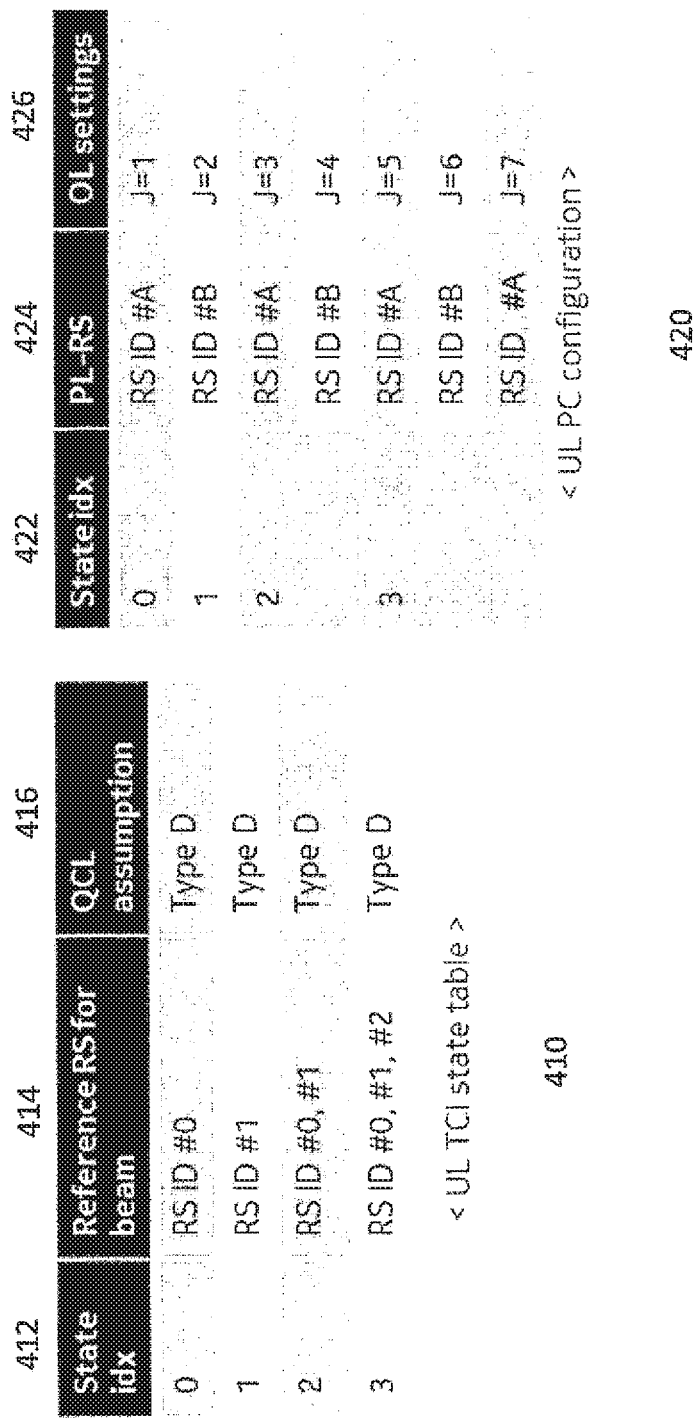
FIG. 4 is a chart illustrating features as described herein.

Referring now to FIG. 4, depicted is an uplink transmission configuration index (UL TCI) state table 410 and an uplink power control (UL PC) configuration table 420, which are simply modified versions of rel-15 DL TCI state and Rel-15 UL power control configuration tables. These tables 410 and 420 show an example of associations between UL TCI state(s) and UL PC configuration(s).

In FIG. 4, it is assumed that RS resources with ID #0, #2, shown in the second column 414 of the UL TCI state table 410, are configured for panel 0. It is assumed that RS resources with ID #1, shown in the second column 414 of the UL TCI state table 410, are configured for panel 1. In the UL PC configuration table 420, it is assumed that RS resource with ID #A is configured for panel 0 and RS resource with ID #B is configured for panel 1, shown in the second column 424 of the UL PC configuration table 420.

In the example of FIG. 4, for states with more than 1 reference RS for beam or for states with more than 1 PL-RS 424 or OL settings 426, further clarifications are needed to indicate the association between UL beam(s) and UL PC configuration(s) for UEs capable of multi-panel simultaneous transmission. For example, see UL TCI state with state idx 2 as shown in the first column 412 of the UL TCI state table 410, and UL PC configuration state with state idx 2 as shown in the first column 422 of the UL PC configuration table 420. There are two beams or reference RS for beam in state idx 2 in the UL TCI state table 410 and there are two pairs of PL-RS 424 and OL settings 426 in state idx 2 of UL PC configuration table 420 where the associations between reference RS of beam and UL PC settings are not shown.

Additionally, in the example of FIG. 4, the size/contents of each element in the UL PC configuration table 420 varies. As a result, a new MAC control element (CE) signal may be defined, if MAC CE-based dynamic updates of the UL PC configuration is supported.

In one example embodiment, instead of defining beam-specific UL PC configuration(s) as in FIG. 4, UL PC settings may be configured with respect to the source of spatial relation information. In other words, UL PC settings may be configured for each reference resource that can be used for UL beam indication.

In FIG. 4, quasi co-location (QCL) assumptions are included 416 in the UL TCI state table 410. In the example embodiments, it is assumed that the QCL assumptions are the same for each state idx 412.

FIG. 5 shows an example configuration of associations between beam reference RS (i.e. source of spatial relation information) and UL PC settings. UL PC is configured per source of spatial relation information. The first column 510 of FIG. 5 shows the source of spatial relation information. The second column 520 of FIG. 5 shows the pathloss measurement reference signal (PL-RS). The third column 530 of FIG. 5 shows the open-loop (OL) parameter value settings. In the example of FIG. 5, RS resources with ID #0, #2, shown in the first column 510, are configured for panel 0, as in the UL TCI state table 410 of FIG. 4, and RS resource with ID #A is configured for panel 0, as in the UL PC configuration table 420 of FIG. 4. In FIG. 5, RS resource with ID #1, shown in the first column 510, is configured for panel 1, as in the UL TCI state table 410 of FIG. 4, and RS resource with ID #B is configured for panel 1, as in the UL PC configuration table 420 of FIG. 4. In the example of FIG. 5, RS resource with ID #3 or with ID #C are configured for panel 1.

The combination of FIG. 5 with the UL TCI state table 410 of FIG. 4 may make clear to the UE the overall operation of UL PC without any additional configuration.

In FIG. 5, parameter T of OL settings, as shown in the third column 530, corresponds to 'j' of UL power control equation in Rel-15, which is an indicator selecting the value of open-loop power control parameters α and $P_0$. OL settings were also shown in the third column 426 of the UL PC configuration table 420 of FIG. 4. The UL power control equation in Rel-15 is shown below:

as FIG. 5. Accordingly, state idx 612 corresponds to state idx 412; reference RS for beam 614 corresponds to reference RS for beam 414; QCL assumption 616 corresponds to QCL assumption 416; reference RS for beam 622 corresponds to reference RS for beam 510; PL-RS 624 corresponds to PL-RS 520; and OL settings 626 corresponds to OL settings 530. For UL scheduling, gNb naturally needs to indicate the UL beam to the UE, but no additional information may need to be included in the UL grant because the UE may determine the associated UL PC configuration(s) based on the UL beam indicator, as shown in FIG. 6.

In an example embodiment, UL panel-specific power control and UL beam-specific power control may be defined for SRS/PUSCH/PUCCH/PRACH preamble transmission. In an example embodiment, a scheme can be applied using unified UL beam indicators, such as UL TCI states, where one or multiple beams from multiple panels can be indicated together, even if there are significant differences in required transmission power between beams and/or panels. In contrast to Rel-15, in which associations between SRI and UL PC settings (pathloss RS ID, open-loop parameter value) are configured, in the example embodiment, associations may be configured between UL beam(s) (i.e. source(s) of spatial relation information) and UL PC setting(s).

In an example embodiment, a mechanism may be defined to dynamically indicate an UL TX antenna panel or beam together with panel/beam-specific power control setting(s) to a UE without requiring additional DCI fields/contents for any types of multi-beam/panel UL transmission. Configuration of direct association between an UL beam/panel and UL PC setting(s) may result in no need for additional dynamic signaling for UL PC configuration. Multiple pathloss RS or open-loop parameter(s) may be indicated using a single DCI; therefore, multiple beam/panel transmission with significant differences in required transmission power, e.g., UL multiple transmission/reception points (multi-TRP), may also be supported with the example embodiment.

In an example embodiment, a mechanism may be defined for using a unified UL beam indicator with dynamic change/switching of active UL beam management. For example, the example embodiment may support UL transmission power control with MAC CE/DCI-based selection of active UL TCI states from a set of TCI states for a single antenna panel or for a simultaneous multi-panel UL transmission. In another example, the example embodiment may support UL TCI state-specific power control, where the states may be dynamically adapted based on MAC CE. When spatial relation information for an UL TCI state is updated via MAC CE, the associated power control settings, including PL-RS or open-loop parameter value, may be automatically updated without additional signaling as needed in a baseline system. For the set of UL TCI states, where one of the states can be activated, UL PC settings may be configured with the same $$P_{PUSCH,b,f,c}(i, j, q_d, l) =$$

$$\min \left\{ \begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array} \right\}$$

FIG. 6 is an example of how the UE understands or interprets the association between an UL transmission beam and the corresponding power control configuration. Note that the upper left table 610 is the same as the UL TCI state table 410 of FIG. 4, and the upper right table 620 is the same amount of RRC signaling overhead, regardless of the number of configured UL TCI states.

In an example embodiment, to support beam-specific power control, a UE may be configured with multiple PL-RS and multiple values of open-loop power control parameters at the same time. For each scheduled PUSCH transmission, an UL grant may contain additional information regarding which configured PL-RS and which value of open-loop parameters are to be applied for power control. In Rel-15, such information was associated with an UL beam indicator, and additional bits were avoided. In Rel-16, since multiple panels or multiple beams indicated by a single UL grant may have significant differences in experienced pathloss or interference environment, such UL beam indicator-based UL power control might not be valid; multiple UL beam indicators, or multiple indicators for power control configuration selection, where the number of indicator will vary according to the number of UE panels or the number of beams selected for each UL transmission, may be necessary. A need for such a configuration of indicators might result in variation of DCI size per UE or per UL transmission. Thus, in an example embodiment, instead of UL beam indicator-based UL power control settings, an example embodiment of the invention may comprise beam reference resource/source of spatial relation information-based UL power control.

In an example embodiment, during the UL beam management process, a gNb may configure multiple UL candidate beams, which may be dynamically selected for each UL transmission. For UL beam alignment between gNb and UE, a resource RS may be configured as the source of spatial relation information for each candidate beam. In FIG. 4, the reference RS is indicated in the second column 414 of the UL TCI state table 410. In FIG. 6, the reference RS is indicated in the second column 634 of the lower table 630. Note that in the upper right table 620 of FIG. 6, the reference signal indexed by RS ID #3 is not configured as a source of spatial relation information for a candidate beam in upper left table 610. Because of this, the UE does not find any usage for RS ID #3 in lower table 630; however, it is assumed that a beam associated with source of spatial relation information RS ID #3 has a possibility to be used as the UL beam for transmission.

In an example embodiment, a UE may be configured with multiple PL-RSs, where separate measurements of pathloss may be performed for each RS. The amount of pathloss RS, or the amount of pathloss RS per panel, may be determined based on the difference in pathloss or required transmission power per beam/panel.

In FIG. 6, for beams transmitted via panel 0, gNb configured one pathloss RS, indicated by RS ID #A, 624, as shown in the upper right table 620. This is also shown in FIG. 6 at 636. In FIG. 6, for beams transmitted via panel 1, gNb configured two pathloss RSs indicated by RS ID #B, #C, 624, as shown in the upper right table 620. This is also shown in FIG. 6 at 636. This means that the beams to be transmitted via panel 0 may have similar pathloss or required transmission power, while the beams transmitted via panel 1 may have significant differences in pathloss or required transmission power, as the pathloss measured by #B may be different than the pathloss measured by #C, 624.

Since pathloss RS 636 and open-loop parameter values 638 are configured for each UL candidate beam, when a UL beam is indicated by UL grant, the UE may be able to determine which pathloss RS and open loop parameter value(s) should be used for UL PC.

Figure 7:
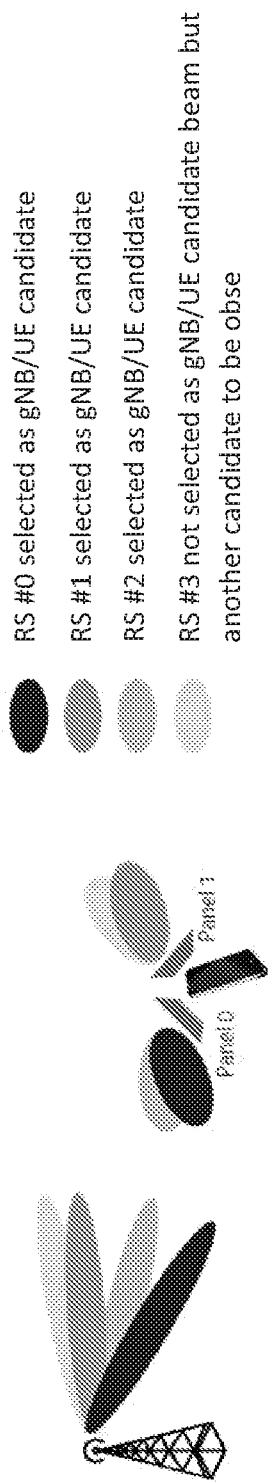
FIG. 7 is a diagram illustrating features as described herein.

FIG. 7 is an example of UL candidate beam selection. Panel 0 is capable of transmitting beams RS #0 and RS #2, while panel 1 is capable of transmitting beams RS #1 and RS #3. RS #0, RS #1, and RS #2 are selected as candidate beams for UL transmission. RS #3 is not selected.

Figure 8:
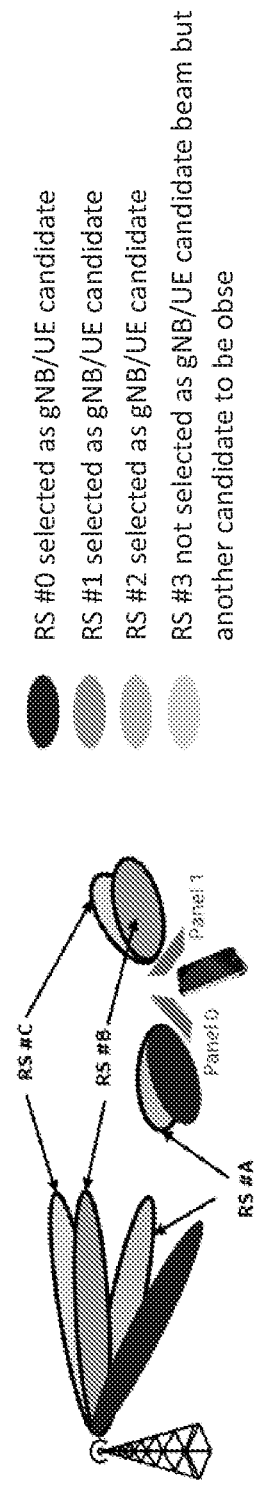
FIG. 8 is a diagram illustrating features as described herein.

FIG. 8 is an example of PL-RS configuration. In FIG. 8, it is assumed that RS #0 will show very different pathloss than RS #2, and this difference in pathloss is a reason to choose not to configure RS #0 as a candidate beam. Based on this candidate beam selection, separate pathloss measurement may be needed between RS #3 and RS #1, while one common RS (RS #A) for pathloss measurement for panel 0 (RS #A) may be configured. Different values of open loop parameter, e.g., $P_0$ may be configured between candidate beams according to RS #3 and RS #1 to handle the difference in pathloss.

Figure 9:
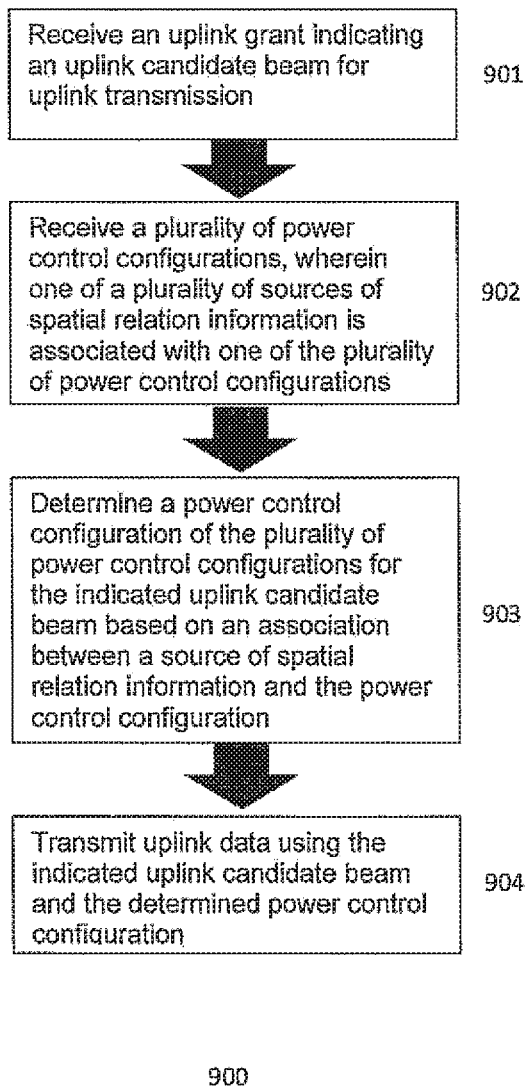
FIG. 9 is a flowchart illustrating steps as described herein.

FIG. 9 illustrates the potential steps of an example embodiment. In accordance with one aspect, an example method 900 may be provided comprising: receiving an uplink grant or PUCCH indicating an uplink candidate beam for uplink transmission, 901; receiving a plurality of power control configurations, where one of a plurality of sources of spatial relation information is associated with one of the plurality of power control configurations, 902; determining a power control configuration of the plurality of power control configurations for the indicated uplink candidate beam based on an association between a source of spatial relation information and the power control configuration, 903; and transmitting uplink data using the indicated uplink candidate beam and the determined power control configuration, 904.

Figure 10:
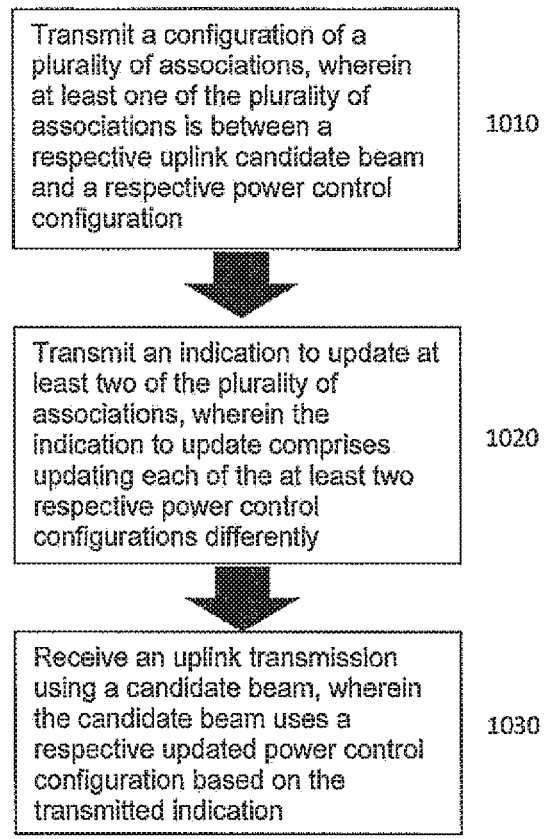
FIG. 10 is a flowchart illustrating steps as described herein.

FIG. 10 illustrates the potential steps of an example embodiment. In accordance with one aspect, an example method 1000 may be provided comprising: transmitting a configuration of a plurality of associations, where at least one of the plurality of associations is between a respective uplink candidate beam and a respective power control configuration, 1010; transmitting an indication to update at least two of the plurality of associations, where the indication to update comprises updating each of the at least two respective power control configurations differently, 1020; and receiving an uplink transmission using a candidate beam, where the candidate beam uses a respective updated power control configuration based on the transmitted indication, 1030.

Figure 11:
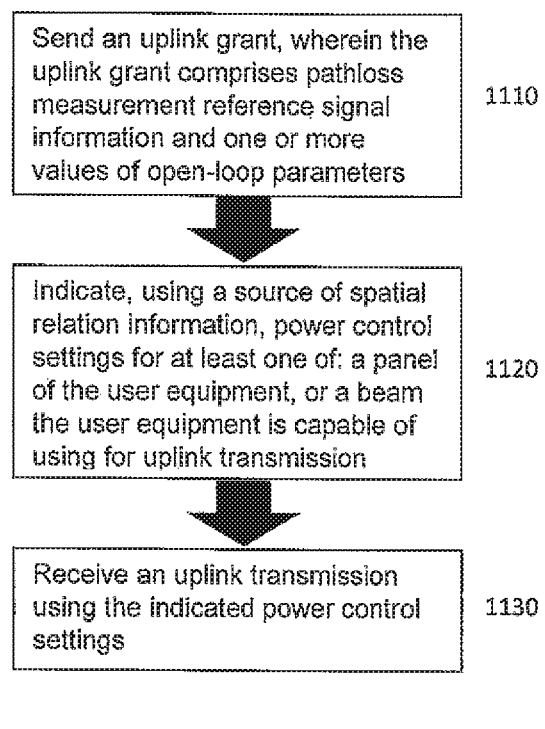
FIG. 11 is a flowchart illustrating steps as described herein.

FIG. 11 illustrates the potential steps of an example embodiment. In accordance with one aspect, an example method 1100 may be provided comprising: sending an uplink grant, wherein the uplink grant comprises pathloss measurement reference signal information and one or more values of open-loop parameters, 1110; indicating, using a source of spatial relation information, power control settings for at least one of: a panel of the user equipment, or a beam the user equipment is capable of using for uplink transmission, 1120; and receiving an uplink transmission using the indicated power control settings, 1130.

In accordance with one aspect, an example method may comprise: receiving, at a user equipment, an uplink grant indicating an uplink candidate beam for uplink transmission; receiving, at the user equipment, a plurality of power control configurations, wherein one of a plurality of sources of spatial relation information is associated with one of the plurality of power control configurations; determining, at the user equipment, a power control configuration of the plurality of power control configurations for the indicated uplink candidate beam based on an association between a source of spatial relation information and the power control configuration; and transmitting, from the user equipment, uplink data using the indicated uplink candidate beam and the determined power control configuration.

The example method may further comprise: receiving, at the user equipment, an indication to update at least one association of a respective one of the plurality of sources of spatial relation information with a respective one of the plurality power control configurations; and updating, at the user equipment, the at least one association according to the indication.

The indication to update the at least one association may comprise at least one of: a medium access control element, a downlink control information, or a unified beam indicator.

The indication to update the at least one association may comprise a selection of an uplink transmission configuration state for one or more panels of the user equipment.

Each of the plurality of power control configurations may comprise at least one of: pathloss measurement reference signal information, or values of open loop parameters.

In accordance with one example embodiment, an apparatus may comprise: at least one processor; and at least one memory including computer program code; the at least one memory and the computer program code configured to, with the at least one processor, cause the apparatus to: receive an uplink grant indicating an uplink candidate beam for uplink transmission; receive a plurality of power control configurations, wherein one of a plurality of sources of spatial relation information is associated with one of the plurality of power control configurations; determine a power control configuration of the plurality of power control configurations for the indicated uplink candidate beam based on an association between a source of spatial relation information and the power control configuration; and transmit uplink data using the indicated uplink candidate beam and the determined power control configuration.

The example apparatus, wherein the at least one memory and the computer program code may be further configured to, with the at least one processor, cause the apparatus to: receive an indication to update at least one association of a respective one of the plurality of sources of spatial relation information with a respective one of the plurality power control configurations; and update the at least one association according to the indication.

The indication to update the at least one association may comprise at least one of: a medium access control element, a downlink control information, or a unified beam indicator.

The indication to update the at least one association may comprise a selection of an uplink transmission configuration state for one or more panels of the user equipment.

Each of the plurality of power control configurations may comprise at least one of: pathloss measurement reference signal information, or one or more values of open-loop parameters.

In accordance with one example embodiment, an apparatus may comprise means for performing: receiving an uplink grant indicating an uplink candidate beam for uplink transmission; receiving a plurality of power control configurations, wherein one of a plurality of sources of spatial relation information is associated with one of the plurality of power control configurations; determining a power control configuration of the plurality of power control configurations for the indicated uplink candidate beam based on an association between a source of spatial relation information and the power control configuration; and transmitting uplink data using the indicated uplink candidate beam and the determined power control configuration.

The means may be further configured to perform: receiving an indication to update at least one association of a respective one of the plurality of sources of spatial relation information with a respective one of the plurality power control configurations; and updating the at least one association according to the indication.

The indication to update the at least one association may comprise at least one of: a medium access control element, a downlink control information, or a unified beam indicator.

The indication to update the at least one association may comprise a selection of an uplink transmission configuration state for one or more panels of the user equipment.

Each of the plurality of power control configurations may comprise at least one of: pathloss measurement reference signal information, or one or more values of open-loop parameters.

In accordance with another example embodiment, a non-transitory program storage device readable by a machine may be provided, tangibly embodying a program of instructions executable by the machine for performing operations, the operations comprising: receiving an uplink grant indicating an uplink candidate beam for uplink transmission; receiving a plurality of power control configurations, wherein one of a plurality of sources of spatial relation information is associated with one of the plurality of power control configurations; determining a power control configuration of the plurality of power control configurations for the indicated uplink candidate beam based on an association between a relevant source of spatial relation information and the power control configuration; and transmitting uplink data using the indicated uplink candidate beam and the determined power control configuration.

The example non-transitory program storage device may have operations further comprising: receiving an indication to update at least one association of a respective one of the plurality of sources of spatial relation information with a respective one of the plurality power control configurations; and updating the at least one association according to the indication.

The indication to update the at least one association may comprise at least one of: a medium access control element, a downlink control information, or a unified beam indicator.

The indication to update the at least one association may comprise a selection of an uplink transmission configuration state for one or more panels of the user equipment.

Each of the plurality of power control configurations may comprise at least one of: pathloss measurement reference signal information, or one or more values of open-loop parameters.

In accordance with another example embodiment, a computer readable medium of wireless communication storing a program of instructions, execution of which by a processor configures an apparatus to at least: receive an uplink grant indicating an uplink candidate beam for uplink transmission; receive a plurality of power control configurations, wherein one of a plurality of sources of spatial relation information is associated with one of the plurality of power control configurations; determine a power control configuration of the plurality of power control configurations for the indicated uplink candidate beam based on an association between a relevant source of spatial relation information and the power control configuration; and transmit uplink data using the indicated uplink candidate beam and the determined power control configuration.

In accordance with one aspect, an example method comprises: transmitting, to a user equipment, a configuration of a plurality of associations, wherein at least one of the plurality of associations is between a respective uplink candidate beam and a respective power control configuration; transmitting, to the user equipment, an indication to update at least two of the plurality of associations, wherein the indication to update comprises updating each of the at least two respective power control configurations differently; and receiving, from the user equipment, an uplink transmission using a candidate beam, wherein the candidate beam uses a respective updated power control configuration based on the transmitted indication.

The indication to update the at least two of the plurality of associations may comprise at least one of: a medium access control element, a downlink control information, or a unified beam indicator.

The downlink control information may be of a constant size.

Each respective power control configuration may comprise at least one of: pathloss measurement reference signal information, or one or more values of open-loop parameters.

In accordance with one example embodiment, an apparatus may comprise: at least one processor; and at least one memory including computer program code; the at least one memory and the computer program code configured to, with the at least one processor, cause the apparatus to: transmit a configuration of a plurality of associations, wherein at least one of the plurality of associations is between a respective uplink candidate beam and a respective power control configuration; transmit an indication to update at least two of the plurality of associations, wherein the indication to update comprises updating each of the at least two respective power control configurations differently; and receive an uplink transmission using a candidate beam, wherein the candidate beam uses a respective updated power control configuration based on the transmitted indication.

The indication to update the at least two of the plurality of associations may comprise at least one of: a medium access control element, a downlink control information, or a unified beam indicator.

The downlink control information may be of a constant size.

Each respective power control configuration may comprise at least one of: pathloss measurement reference signal information, or one or more values of open-loop parameters.

In accordance with one example embodiment, an apparatus may comprise means for performing: transmitting a configuration of a plurality of associations, wherein at least one of the plurality of associations is between a respective uplink candidate beam and a respective power control configuration; transmitting an indication to update at least two of the plurality of associations, wherein the indication to update comprises updating each of the at least two respective power control configurations differently; and receiving an uplink transmission using a candidate beam, wherein the candidate beam uses a respective updated power control configuration based on the transmitted indication.

The indication to update the at least two of the plurality of associations may comprise at least one of: a medium access control element, a downlink control information, or a unified beam indicator.

The downlink control information may be of a constant size.

Each respective power control configuration may comprise at least one of: pathloss measurement reference signal information, or one or more values of open-loop parameters.

In accordance with another example embodiment, a non-transitory program storage device readable by a machine may be provided, tangibly embodying a program of instructions executable by the machine for performing operations, the operations comprising: transmitting a configuration of a plurality of associations, wherein at least one of the plurality of associations is between a respective uplink candidate beam and a respective power control configuration; transmitting an indication to update at least two of the plurality of associations, wherein the indication to update comprises updating each of the at least two respective power control configurations differently; and receiving an uplink transmission using a candidate beam, wherein the candidate beam uses a respective updated power control configuration based on the transmitted indication.

The indication to update the at least two of the plurality of associations may comprise at least one of: a medium access control element, a downlink control information, or a unified beam indicator.

The downlink control information may be of a constant size.

Each respective power control configuration may comprise at least one of: pathloss measurement reference signal information, or one or more values of open-loop parameters.

In accordance with another example embodiment, a computer readable medium of wireless communication storing a program of instructions, execution of which by a processor configures an apparatus to at least: transmit a configuration of a plurality of associations, wherein at least one of the plurality of associations is between a respective uplink candidate beam and a respective power control configuration; transmit an indication to update at least two of the plurality of associations, wherein the indication to update comprises updating each of the at least two respective power control configurations differently; and receive an uplink transmission using a candidate beam, wherein the candidate beam uses a respective updated power control configuration based on the transmitted indication.

In accordance with one aspect, an example method may comprise: sending, to a user equipment, an uplink grant, wherein the uplink grant comprises pathloss measurement reference signal information and one or more values of open-loop parameters; indicating to the user equipment, using a source of spatial relation information, power control settings for at least one of: a panel of the user equipment, or a beam the user equipment is capable of using for uplink transmission; and receiving, from the user equipment, an uplink transmission using the indicated power control settings.

In accordance with one example embodiment, an apparatus may comprise: at least one processor; and at least one memory including computer program code; the at least one memory and the computer program code configured to, with the at least one processor, cause the apparatus to: send an uplink grant, wherein the uplink grant comprises pathloss measurement reference signal information and one or more values of open-loop parameters; indicate, using a source of spatial relation information, power control settings for at least one of: a panel of the user equipment, or a beam the user equipment is capable of using for uplink transmission; and receive an uplink transmission using the indicated power control settings.

In accordance with one example embodiment, an apparatus may comprise means for performing: sending an uplink grant, wherein the uplink grant comprises pathloss measurement reference signal information and one or more values of open-loop parameters; indicating, using a source of spatial relation information, power control settings for at least one of: a panel of the user equipment, or a beam the user equipment is capable of using for uplink transmission; and receiving an uplink transmission using the indicated power control settings.

In accordance with another example embodiment, a non-transitory program storage device readable by a machine may be provided, tangibly embodying a program of instructions executable by the machine for performing operations, the operations comprising: sending an uplink grant, wherein the uplink grant comprises pathloss measurement reference signal information and one or more values of open-loop parameters; indicating, using a source of spatial relation information, power control settings for at least one of: a panel of the user equipment, or a beam the user equipment is capable of using for uplink transmission; and receiving an uplink transmission using the indicated power control settings.

In accordance with another example embodiment, a computer readable medium of wireless communication storing a program of instructions, execution of which by a processor configures an apparatus to at least: send an uplink grant, wherein the uplink grant comprises pathloss measurement reference signal information and one or more values of open-loop parameters; indicate, using a source of spatial relation information, power control settings for at least one of: a panel of the user equipment, or a beam the user equipment is capable of using for uplink transmission; and receive an uplink transmission using the indicated power control settings.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

The invention claimed is:

1. An apparatus comprising:
at least one processor; and
at least one memory storing instructions that, when executed with the at least one processor, cause the apparatus to:
receive an uplink grant indicating an uplink candidate beam for uplink transmission;
receive a plurality of power control configurations, wherein one of a plurality of sources of spatial relation information is associated with one of the plurality of power control configurations;
receive an indication to update at least one association of a respective one of the plurality of sources of spatial relation information with a respective one of the plurality power control configurations;
update the at least one association based on the indication;
determine a power control configuration of the plurality of power control configurations for the indicated uplink candidate beam based on the at least one updated association; and
transmit uplink data using the indicated uplink candidate beam and the determined power control configuration.

2. The apparatus of claim 1, wherein the indication to update the at least one association comprises an indication to update at least two of the plurality of associations of respective ones of the plurality of sources of spatial relation information with respective ones of the plurality power control configurations, wherein the indication comprises an indication to update respective ones of at least two respective power control configurations differently.

3. The apparatus of claim 1, wherein the indication to update the at least one association comprises at least one of:
a medium access control element,
a downlink control information, or
a unified beam indicator.

4. The apparatus of claim 1, wherein the indication to update the at least one association comprises a selection of an uplink transmission configuration state for one or more panels of the apparatus.

5. The apparatus of claim 1, wherein respective ones of the plurality of power control configurations comprise at least one of:
pathloss measurement reference signal information, or
one or more values of open-loop parameters.

6. The apparatus of claim 1, wherein the one of the plurality of sources of spatial relation information comprises the uplink candidate beam.

7. The apparatus of claim 1, wherein the one of the plurality of sources of spatial relation information comprises an uplink antenna panel.

8. The apparatus of claim 1, wherein the one of the plurality of sources of spatial relation information comprises a sounding reference signal preamble.

9. The apparatus of claim 1, wherein the one of the plurality of sources of spatial relation information comprises a reference signal.

10. The apparatus of claim 1, wherein the one of the plurality of sources of spatial relation a transmission information comprises configuration index state.

11. A method, comprising:
receiving, at a user equipment, an uplink grant indicating an uplink candidate beam for uplink transmission;
receiving, at the user equipment, a plurality of power control configurations, wherein one of a plurality of sources of spatial relation information is associated with one of the plurality of power control configurations;
receiving an indication to update at least one association of a respective one of the plurality of sources of spatial relation information with a respective one of the plurality power control configurations;
updating the at least one association based on the indication;
determining, at the user equipment, a power control configuration of the plurality of power control configurations for the indicated uplink candidate beam based on the at least one updated association; and
transmitting, from the user equipment, uplink data using the indicated uplink candidate beam and the determined power control configuration.

12. The method of claim 11, wherein the indication to update the at least one association comprises an indication to update at least two of the plurality of associations of respective ones of the plurality of sources of spatial relation information with respective ones of the plurality power control configurations, wherein the indication comprises an indication to update respective ones of at least two respective power control configurations differently.

13. The method of claim 11, wherein the indication to update the at least one association comprises at least one of:
a medium access control element,
a downlink control information, or
a unified beam indicator.

14. The method of claim 11, wherein the indication to update the at least one association comprises a selection of an uplink transmission configuration state for one or more panels of the user equipment.

15. The method of claim 11, wherein respective ones of the plurality of power control configurations comprise at least one of:
- pathloss measurement reference signal information, or
- one or more values of open-loop parameters.

16. A non-transitory computer-readable medium comprising program instructions stored thereon for performing at least the following:
- causing receiving, with a user equipment, of an uplink grant indicating an uplink candidate beam for uplink transmission;
- causing receiving of a plurality of power control configurations, wherein one of a plurality of sources of spatial relation information is associated with one of the plurality of power control configurations;
- causing receiving of an indication to update at least one association of a respective one of the plurality of sources of spatial relation information with a respective one of the plurality power control configurations;
- updating the at least one association based on the indication;
- determining a power control configuration of the plurality of power control configurations for the indicated uplink candidate beam based on the at least one updated association; and
- causing transmitting of uplink data using the indicated uplink candidate beam and the determined power control configuration.

17. The non-transitory computer-readable medium of claim 16, wherein the indication to update the at least one association comprises an indication to update at least two of the plurality of associations of respective ones of the plurality of sources of spatial relation information with respective ones of the plurality power control configurations, wherein the indication comprises an indication to update respective ones of at least two respective power control configurations differently.

18. The non-transitory computer-readable medium of claim 16, wherein the indication to update the at least one association comprises at least one of:
- a medium access control element,
- a downlink control information, or
- a unified beam indicator.

19. The non-transitory computer-readable medium of claim 16, wherein the indication to update the at least one association comprises a selection of an uplink transmission configuration state for one or more panels of the user equipment.

20. The non-transitory computer-readable medium of claim 16, wherein respective ones of the plurality of power control configurations comprise at least one of:
- pathloss measurement reference signal information, or
- one or more values of open-loop parameters.

* * * * *